United States Patent Office 3,629,146
Patented Dec. 21, 1971

3,629,146
CATALYST IMPREGNATION METHOD
Charles T. Adams, Houston, Tex., assignor to
Shell Oil Company, New York, N.Y.
No Drawing. Filed Mar. 24, 1969, Ser. No. 810,029
Int. Cl. B01j *11/82*
U.S. Cl. 252—435                                  5 Claims

ABSTRACT OF THE DISCLOSURE

A method of preparing a supported hydrogenation metal catalyst containing high metal concentrations in a single impregnation using an aqueous impregnating solution containing high concentration of hydrogenation metal in solution and stabilized against precipitation by the presence of phosphoric acid and hydrogen peroxide in the solution.

BACKGROUND OF THE INVENTION

Field of the invention

This invention deals with the manufacture of supported metal hydrogenation catalyst. More particularly, the invention relates to the production of a hydrogenation catalyst in which high metal loading and good metal dispersion is obtained through the use of a novel impregnation solution.

Discussion of the prior art

Supported hydrogenation metal catalysts are widely used in the petroleum industry. Hydrotreating various streams for removal of impurities such as sulfur and nitrogen and aromatics and naphthenic hydrogenation processes are exemplary. While many commercial catalysts are available there is a definite need for catalysts having improved hydrogenation activity. Catalysts having higher metal contents than presently available are required.

The most straight-forward and customary means of preparing such catalyst is by impregnation of a suitable alumina carrier with a solution of the desired hydrogenative metal salts. To obtain efficient impregnation and uniform distribution of metal on the support, the metals must be maintained in solution during the impregnation. Precipitation of metals from the impregnating solution leads to non-uniform impregnation and loss in effectiveness of the deposited metal. Thus, the principal difficulty in preparing impregnated catalyst—of high metal loading in a single impregnation procedure—is in obtaining sufficient concentration of metal ions in solution.

While multiple impregnations can be used, as taught by the prior art, a single impregnation technique is desirable to reduce the number of steps—with concomitant reduction in costs—in the manufacturing process.

Several methods have been proposed in the prior art to increase impregnation metal solution stability.

Riedl, U.S. 2,739,132, discloses a method of impregnation of catalyst supports in which the impregnating solution is a peracid of the desired metal, the peracid being formed by reacting a metallic acid or other metal solution with hydrogen peroxide. The amount of hydrogen peroxide is in molar excess of the metallic acid and preferably from about 3–5 or more molar of hydrogen peroxide per mole of acid.

Colgan et al., U.S. 3,287,280, discloses an impregnating solution which is stabilized with phosphoric acid. This resulting solution is useful to impregnate from about 8 to 20% molybdenum expressed as molybdenum trioxide on alumina. Molybdenum trioxide equal to 20% is equivalent to about 13% expressed as molybdenum metal.

Pessimisis, U.S. 3,232,887, discloses a stabilized impregnating solution containing inorganic phosphorus-containing acidic compounds and preferably orthophosphoric acid.

It has now been discovered that high concentrations of molybdenum can be obtained in solution which allows, in a single impregnation, the incorporation of molybdenum in excess of 12% (as metal) by adding to the ionic metal solution hydrogen peroxide and phosphoric acid. Impregnation to metal contents in excess of those achieved with either hydrogen peroxide or phosphoric acid alone can be obtained with the additional advantage that smaller amounts of the individual additives are required.

SUMMARY OF THE INVENTION

In broad aspect my invention is a method of impregnating a Group VI–B metal on a refractory oxide support in a single impregnation step utilizing a solution of molybdenum stabilized by the addition of phosphate and peroxide ions. The impregnation solution will contain suitable salts of the metal or metal compounds to be impregnated together with hydrogen peroxide and phosphoric acid.

The invention is particularly suitable for impregnation of refractory oxide supports with Group VI–B metals (chromium, molybdenum and tungsten) and Group VIII metals (iron, cobalt and nickel). It is especially suitable for the preparation of a catalyst composite of nickel and molybdenum on alumina. The support used for the preparation of catalyst composites should have a pore volume of between about 0.5 to 0.85 cc./g. Alumina is the preferred support.

For the impregnation of nickel and molybdenum the amount of hydrogen peroxide used should be between about 0.1 to 1.0 moles of hydrogen peroxide/mole of molybdenum and the amount of phosphoric acid should be in the range of 0.2 to 1.0 moles/mole of molybdenum.

The metal is preferably derived from a water soluble salt of the desired metal. Nitrates have proven especially suitable.

Thus, a very suitable impregnating solution will contain nickel nitrate, ammonium molybdate, hydrogen peroxide and phosphoric acid.

Suitable concentration ranges for a nickel/molybdenum impregnating solution are as follows:

Concentration gm./cc.:
  Ni _____ 0.02–0.1
  Mo _____ 0.1–0.5
  $H_3PO_4$ _____ 0.05–0.2
  $H_2O_2$ _____ 0.01–0.1

Further restriction on the solution concentration is imposed by the desired ratio of components as discussed above.

A typical example of a suitable solution which allows the impregnation of molybdenum on an alumina support in excess of 14 percent by weight (basis metal on finished composite) will contain 0.07 gm./cc. Ni, 0.3 gm./cc. Mo, 0.110 gm./cc. $H_3PO_4$ and 0.019 gm./cc. $H_2O_2$.

Not only will such a solution be stable and thus allow a single, effective (evenly dispersed) impregnation of metals but also will result in lower chemical requirements (amounts of $H_3PO_4$ or $H_2O_2$) than would be required by prior art methods using either $H_3PO_4$ or $H_2O_2$ above.

The following examples will further elucidate the process and advantages of the present invention.

EXAMPLE 1

A series of solutions were prepared to determine relative stability (i.e., lack of precipitation over a period of time). The aqueous solutions were prepared from nickel nitrate hydrate [$Ni(NO_3)_2 \cdot 6H_2O$], ammonium molybdate hydrate [$(NH_4)_6Mo_7O_{24} \cdot 4H_2O$], 85% phosphoric solution and 30% hydrogen peroxide solution. The results are shown in Table 1.

TABLE 1

| Solution Number | Stability of Ni-Mo solutions | | | | | | Observation |
| --- | --- | --- | --- | --- | --- | --- | --- |
| | Concentration, g./cc. | | | | Mole ratio | | |
| | Ni | Mo | $H_3PO_4$ | $H_2O_2$ | $H_3PO_4/Mo$ | $H_2O_2/Mo$ | |
| 1 | 0.048 | 0.21 | | | | | Precipitation after 15 minutes. |
| 2 | 0.048 | 0.21 | 0.086 | | 0.40 | | Clear green solution to 24 hours. |
| 3 | 0.066 | 0.27 | 0.110 | | 0.40 | | Solution turbid, precipitation evident after 2 hours. |
| 4 | 0.048 | 0.21 | | 0.074 | | 1.0 | Clear green-yellow solution to 24 hours. |
| 5 | 0.066 | 0.27 | | 0.074 | | 1.0 | Clear green solution initially, precipitation after 2 hours. |
| 6 | 0.066 | 0.27 | | 0.037 | | 0.5 | Clear green solution initially, precipitation evident after 1 hour. |
| 7 | 0.066 | 0.27 | 0.110 | 0.037 | 0.40 | 0.5 | Clear solution to 24 hours. |
| 8 | 0.066 | 0.27 | 0.110 | 0.019 | 0.40 | 0.25 | Do. |
| 9 | 0.083 | 0.34 | 0.139 | 0.060 | 0.40 | 0.5 | Clear solution, light precipitation after 24 hours. |

The unique character of the combined use of $H_3PO_4$ and $H_2O_2$ as metal solution stabilizers is evident from Table 1. With a carrier having a pore volume of 0.5 to 0.85 cc./g., catalysts containing more than 14 percent by weight metals (basis finished catalysts) can be prepared only with solutions 7, 8 and 9. Although solution 2 (which does not contain $H_2O_2$) and solution 4 (which does not contain phosphoric acid) are stable, the concentrations of metal salts in these solutions are not sufficiently high to provide the desired metals loading in a single step.

EXAMPLE 2

This example gives a preferred procedure for preparing impregnated catalyst according to the invention.

A dry-pore-volume impregnation procedure is used such that carrier pores are just filled with a solution of the metal salts. A solution suitable for impregnating 100 g. of an alumina (surface area, 265 m.²/g.; pore volume, 0.67 cc./g.; bulk density, 0.65 g./cc.) is prepared as follows:

Phosphoric acid (15.81 g.) is added to 18 ml. of solution containing 20.76 g. of nickel nitrate hexahydrate. The ammonium molybdate (31.31 g.) is slurried with 18 ml. $H_2O$ dissolved with addition of 10.03 g. $H_2O_2$ (30% solution). The ammonium molybdate solution is added to the nickel nitrate solution. The solution is diluted to 67 ml. The Ni-Mo solution is added to the alumina and tumbled for 20–30 minutes. To minimize leaching of the alumina with the impregnating solution and to maintain a stable Ni-Mo solution during the impregnation, the temperature of the impregnation is maintained below 150° F., and preferably below about 100° F.

The catalyst is dried for two hours at 250° F. and calcined 2 hours at 900° F.

The finished catalyst would have a composition as follows:

| | Percent |
| --- | --- |
| NiO | 3.76 |
| $MoO_3$ | 18.0 |
| $HPO_3$ | 7.74 |
| $Al_2O_3$ | 70.53 |
| Ni | 2.93 |
| Mo | 12.0 |
| P | 3.0 |

EXAMPLE 3

A catalyst prepared, in the single impregnation procedure of Example 2, was used for hydrodenitrification of a catalyst cracked gas oil.

Feed properties and conditions were as follows:

Feed properties:

| | |
| --- | --- |
| API gravity at 60° F. | 23.6 |
| Carbon, percent by weight | 87.70 |
| Hydrogen, percent by weight | 11.48 |
| Nitrogen percent by weight | 0.0349 |
| Sulfur, percent by weight | 0.78 |
| Boiling range, ° F. | |

Conditions: 850 p.s.i.g., $2H_2/oil$, 1.0 LHSV and 700° F.

Hydrogen consumption (corresponding to aromatics saturation) was 660 s.c.f./bbl. of feed. Sulfur removal (conversion to $H_2S$) was 99% and nitrogen removal (conversion to $NH_3$) was 97%.

I claim as my invention:

1. In a method of preparing a catalyst having a metal content in excess of about 12 percent by weight, basis the finished catalyst, the improvement which comprises impregnating a refractory oxide with an aqueous solution consisting essentially of (1) a mixture of water-soluble compounds of hydrogenation metals, said mixture containing at least one each of a water soluble compound of a Group VI-B and Group VIII metal, and a stabilizing amount of (2) about at least 0.2 mole of phosphoric acid per mole of Group VI-B metal and (3) about at least 0.1 mole of hydrogen peroxide per mole of Group VI-B metal.

2. Ths method of claim 1 wherein the refractory oxide is alumina having a pore volume of between about 0.5 to 0.85 cc./gm.

3. The method of claim 1 wherein the Group VIII metal is nickel and the Group VI-B metal is molybdenum.

4. The method of claim 3 wherein the refractory oxide is alumina having a pore volume of between about 0.5 to 0.85 cc./gm. and the impregnation solution contains molybdenum.

5. In a method of preparing a nickel/molybdenum/alumina catalyst composite, the improvement which comprises impregnating an alumina with an aqueous solution consisting essentially of 0.02 to 0.1 gm./cc. of nickel, as a salt, 0.1 to 0.5 gm./cc. of molybdenum, as a salt, 0.05 to 0.2 gm./cc. of phosphoric acid and 0.01 to 0.1 gm./cc. of hydrogen peroxide.

References Cited

UNITED STATES PATENTS

| | | | |
| --- | --- | --- | --- |
| 2,739,132 | 3/1956 | Riedl | 252—442 X |
| 3,232,887 | 2/1966 | Pessimisis | 252—435 |
| 3,287,280 | 11/1966 | Colgan | 252—435 |

PATRICK P. GARVIN, Primary Examiner